Patented Apr. 12, 1927.

1,624,845

UNITED STATES PATENT OFFICE.

HERMAN DOUGLAS NYBERG, OF NORRKOPING, SWEDEN.

GALVANIC CELL.

No Drawing. Application filed May 24, 1922, Serial No. 563,375, and in Sweden March 28, 1922.

In galvanic cells of the type in which the electrolyte consists of an alkali the electrolytic efficiency has hitherto been very low as regards the alkali employed. Thus, it is generally stated that the consumption is about 4 grams of NaOH (technical) per ampere hour in a cupron cell. The theoretical value is about 1,5 grams of NaOH per 1 amp. hour. In the said cells a concentration of alkali is used which corresponds to 200 grams of technical NaOH per 1 liter of water.

It has now been found that, provided the cell is in other respects suitably arranged, it will be possible by suitably adapting the degree of concentration of the alkali electrolyte (one or several hydrates of an alkali metal including $NH_4$) to obtain a capacity which is several times higher than even the theoretical value.

It has thus been found that, in using a galvanic cell, which has a carbon electrode in the shape of a receptacle acting by air depolarization forming the object of applicant's copending application Serial No. 563,156 and a grid shaped zinc electrode also set forth in the copending application and an electrolyte consisting of about 90 gr. pr. liter of technical NaOH, a capacity expressed in amp. hours may be gained which is several times higher than the value which would correspond to the theoretical value as regards the quantity of NaOH with the supposition that zincate is generated. It is also to be noted that this capacity can be gained at a considerable higher working voltage than in any other previously known primary cell with alkali electrolyte.

By using said electrolyte in the above mentioned cell it will for instance be possible to gain a working voltage of about 1,20 volts at an intensity of about 0,1 ampere, while for instance a cupron cell only gives 0,85 volts at the same intensity of current.

The high capacity gained according to the present invention is due, it is thought, chiefly to the fact that the electrolyte, at the relatively low concentration of alkali, remains practically unaltered during the operation of the cell. This is principally due to the fact that the solubility of for instance zinc hydroxide in alkali at an increasing concentration of the alkali increases with the latter concentration to a certain limit only which according to the latest investigations lies at a concentration of 80 to 100 gr. per liter of NaOH. If the concentration of the alkali be increased above said limit the capacity of the alkali to absorb the zinc hydroxide and maintain the same in solution decreases until a minimum is reached after which the capacity of absorbing the zinc hydroxide again increases until an absolute maximum is attained, which is the case at a concentration of about 33% of NaOH. The said minimum is for NaOH about 150 grams per litre.

On starting from an NaOH concentration in the electrolyte, which is equal to or higher than 150 gr. per litre the solution will absorb dissolved zinc until the same is saturated. No precipitation of white zinc hydroxide can be observed during the working of the cell. This corresponds to that which has hitherto been the case in cells with alkaline electrolyte. The lowest known concentration in such cells has been 175 gr. NaOH per litre corresponding to 15% solution.

If on the other hand one starts according to the present invention from an alkali concentration, which is lower than 150 gr. of NaOH per litre, say for instance 90 grams per litre, there will during the working of the cell soon be formed a white precipitation of zinc hydroxide. Due to the consumption of water, which takes place, when the zinc is transformed into zinc hydroxide, the alkali concentration of the electrolyte will successively approach to the above named concentration at which the solubility of the zinc hydroxide in sodium hydroxide has its minimum resulting in a successive precipitation of zinc hydroxide.

Consequently, on starting from an alkali concentration which is lower than or substantially corresponding to the maximum solubility of the zinc hydroxide it will be possible to practically maintain a high concentration of free alkali and a low concentration of zinc hydroxide for a very long time.

If on the other hand one starts from an alkali concentration which is higher than the one corresponding to the maximum solubility of the zinc hydroxide—which for instance is the case in the cupron cell—the solution is more and more enriched with zinc hydroxide. The solution will in such a case not remain practically unaltered, which will be evident from the fact that in the said cell about 50% only of the theoretical quantity of alkali is utilized.

However, other circumstances may influence this result, such as the formation of deposits on the electrodes, for instance on the cupron plate, which prevent or make difficult the depolarizing action of the copper oxide.

The expression "that the electrolyte remains practically unaltered" means in this connection that the electrolyte is of such a character that a current quantity can be gained from the same which is greater than the theoretical current quantity, provided that the alkali is bound as zincate (or other alkalimetalhydroxide compound).

The object of my present invention is to provide galvanic cells with alkaline electrolytes of the kind described.

This is effected by using alkali alone or by using in connection with the alkali a salt (for instance NaCl) which can exist together with the alkali and has the capacity of precipitating the metal hydroxide from the solution thus preventing the latter from being enriched with the same whereby the electrolyte is maintained practically unaltered. By this means it will thus be possible to maintain a higher concentration of the alkali than the one mentioned above. From the scientific investigations which have been made as to the character of a solution of zinc hydroxide, it seems to be evident that the zinc hydroxide, especially at low concentration of alkali, exists in the shape of a colloidal solution. This colloidal hydroxide solution can be precipitated by means of salts, for instance common salt.

Moreover, during the operation of the cell different concentrations are effected within the cell. Since principally the concentration at the metallic electrode (for instance zinc) is of importance, the above mentioned limit, namely that at which the alkali has the maximum capacity of dissolving the metal hydroxide, cannot be regarded the exact maximal limit. The principal importance must therefore be laid on the capacity of the electrolyte of remaining unaltered.

It may for instance be mentioned that in discharging a cell at 0,1 ampere a starting electrolyte containing 90 gr. per liter of NaOH alone, or an electrolyte containing 150 gr. per liter of NaOH and 200 gr. per liter of NaCl, has produced very good results in connection with the carbon receptacle and zinc-grate electrode set forth in my copending application No. 563,156.

In addition to the above mentioned advantages gained by using such an unaltered electrolyte other advantages are effected such as a reduced consumption of alkali and a reduced absorption of carbonic acid from the air. Moreover, the metal hydroxide of the electrolyte may, for instance by heating the electrolyte, be nearly completely precipitated, whereby said hydroxide and also the alkali may be recovered.

As to the absorption of the carbonic acid the same may be diminished by any suitable arrangement so that the carbonic acid may be absorbed from the air before the latter is utilized as a depolarizer. Also by the addition to the electrolyte of a soluble substance adapted to bind the carbonic acid, the percentage of such acid in the electrolyte may be held rather low.

The present electrolyte is especially adapted to be used in combination with the above electrode in the shape of a carbon receptacle. However, great advantages are also gained if the carbon electrode, instead of forming an outer receptacle, is located centrally within the cell. In this case the carbon rendered active by gas depolarization which is principally of the same character as that of the carbon receptacle according to the above mentioned patent application, that is the surface of the same which is in contact with the electrolyte should be so adapted that the electrolyte may saturate the same to a certain extent, whilst that portion of the carbon electrode, adjacent to the same, or the portion which is in contact with the gas is prevented from becoming saturated by the electrolyte and from permeating the carbon.

Instead of zinc—preferably amalgamized or—any other suitable metal may be used.

The electrolyte may be used in a liquid or in a more or less semi-liquid state.

I claim:

1. In galvanic cells, an alkaline electrolyte, an electropositive metal electrode adapted to be dissolved by said alkaline electrolyte, and an electronegative electrode, the said alkaline electrolyte having a composition adapted to precipitate substantially as hydroxid the electrode metal dissolved, whereby the electrolyte remains practically unaltered in the operation of the cell.

2. In galvanic cells, an alkaline electrolyte an electropositive metal electrode adapted to be dissolved by said alkaline electrolyte, and an electronegative electrode, the said alkaline electrolyte having such a low percentage of alkali that the electrode metal dissolved is precipitated substantially as hydroxid, whereby the electrolyte remains practically unaltered in the operation of the cell.

3. In galvanic cells, an alkaline electrolyte, an electropositive metal electrode adapted to be dissolved by said alkaline electrolyte, an electronegative electrode, the composition of said electrolyte being such as to cause the precipitation of the metal dissolved by the electrolyte as a compound of said metal.

4. In galvanic cells, an alkaline electrolyte, an electropositive metallic electrode adapted to be dissolved by said electrolyte, an electronegative electrode, said alkaline electrolyte having a starting concentration which is considerably lower than that alkali concentration at which the capacity of the electrolyte to dissolve the hydroxide of the positive electrode metal is at a relative minimum.

5. In galvanic cells, a caustic alkaline electrolyte, an electropositive metallic electrode adapted to be dissolved by such electrolyte, an electronegative metallic electrode, the composition of said electrolyte being such as to cause the formation of said dissolved metal as hydroxide and a small proportion of a compound adapted to precipitate the metal hydroxide formed.

6. In a galvanic cell an alkaline electrolyte, an electropositive metal electrode adapted to be dissolved by said alkaline electrolyte and an electronegative electrode, said alkaline electrolyte being of a concentration adapted to precipitate substantially as hydroxide the metal dissolved from the positive electrode, and said negative electrode consisting principally of porous carbonaceous material comprising two mutually cohering layers one of which is in contact with the electrolyte and saturated by the same, while the other layer is not saturated by the electrolyte thus preventing the latter from penetrating, but permits the air to enter therethrough into the saturated layer to act as a depolarizer.

In testimony whereof I have affixed my signature.

HERMAN DOUGLAS NYBERG.